United States Patent [19]
Goodrich

[11] Patent Number: 4,730,218
[45] Date of Patent: Mar. 8, 1988

[54] UNDER-HAND PROJECTOR

[75] Inventor: Dennis L. Goodrich, Ames, Iowa

[73] Assignee: Iowa State University Research Foundation, Inc., Ames, Iowa

[21] Appl. No.: 914,720

[22] Filed: Oct. 2, 1986

[51] Int. Cl.$^4$ .................. H04N 5/247; H04N 5/253
[52] U.S. Cl. .................................. 358/185; 358/102; 434/307
[58] Field of Search ............... 358/185, 102, 93, 229; 434/307

[56] References Cited

U.S. PATENT DOCUMENTS

| | | | |
|---|---|---|---|
| 2,750,444 | 6/1956 | Owens | 358/185 |
| 3,699,252 | 10/1972 | Jackson | 358/185 |
| 3,800,441 | 4/1974 | Macpherson | 358/185 |
| 3,814,853 | 6/1974 | Lardeau | 358/185 |
| 3,824,339 | 7/1974 | Eisenberg | 358/185 |
| 3,936,596 | 2/1976 | Inuiya | 358/102 |

FOREIGN PATENT DOCUMENTS 2262890  9/1975  France .................. 358/185

OTHER PUBLICATIONS

Telemation, Inc., "Telelectern", Model TMV-201A, 11-67.

*Primary Examiner*—Howard W. Britton
*Attorney, Agent, or Firm*—Zarley, McKee, Thomte, Voorhees & Sease

[57] ABSTRACT

A projection system is provided for projecting an image from a lecturer to an audience for viewing by the lecturer, a present audience, and/or a television audience while maintaining a face-to-face orientation between the lecturer and audience. The system comprises a lectern having a top surface, at least a part of which is translucent. The image is operatively positioned on the translucent part of the lectern from above or below the top surface thereof. A video camera operatively connected to a video monitor is focused on the image so that the image is received by the video camera and conveyed to the video monitor. The audience views the image on the video monitor while the lecturer views another monitor and the image on the translucent part of the lectern while remaining in a face-to-face orientation with the audience. Mirrors are used to focus the camera on the image. The camera may also be connected to a video switcher for incorporation in television productions or to a radio frequency modulator so that normal television receivers may be employed instead of monitors. Audio can also be transmitted through the modulator.

8 Claims, 5 Drawing Figures

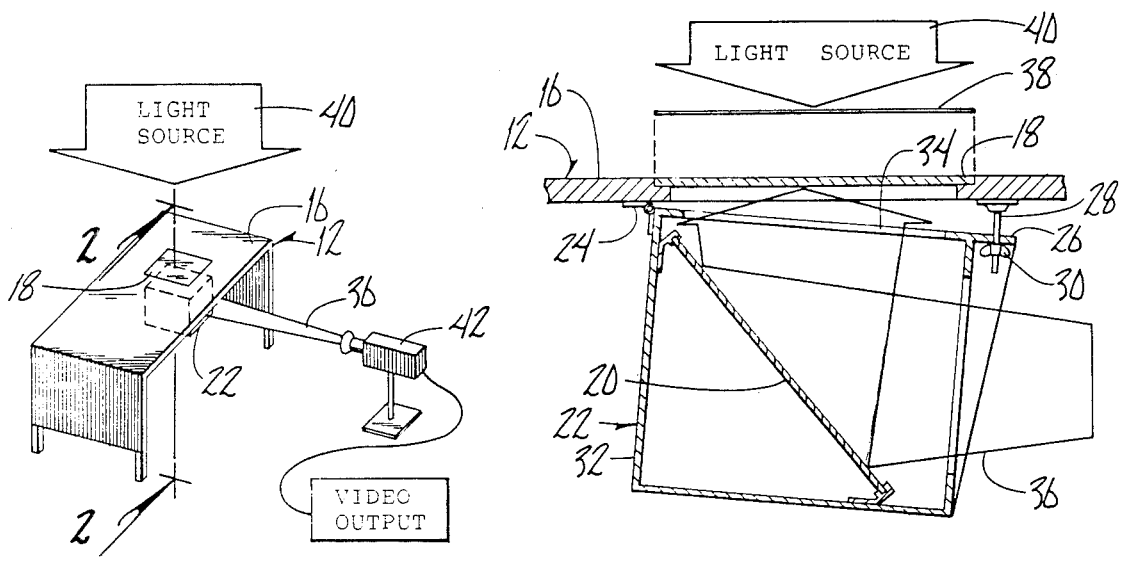
Fig. 1
Fig. 2
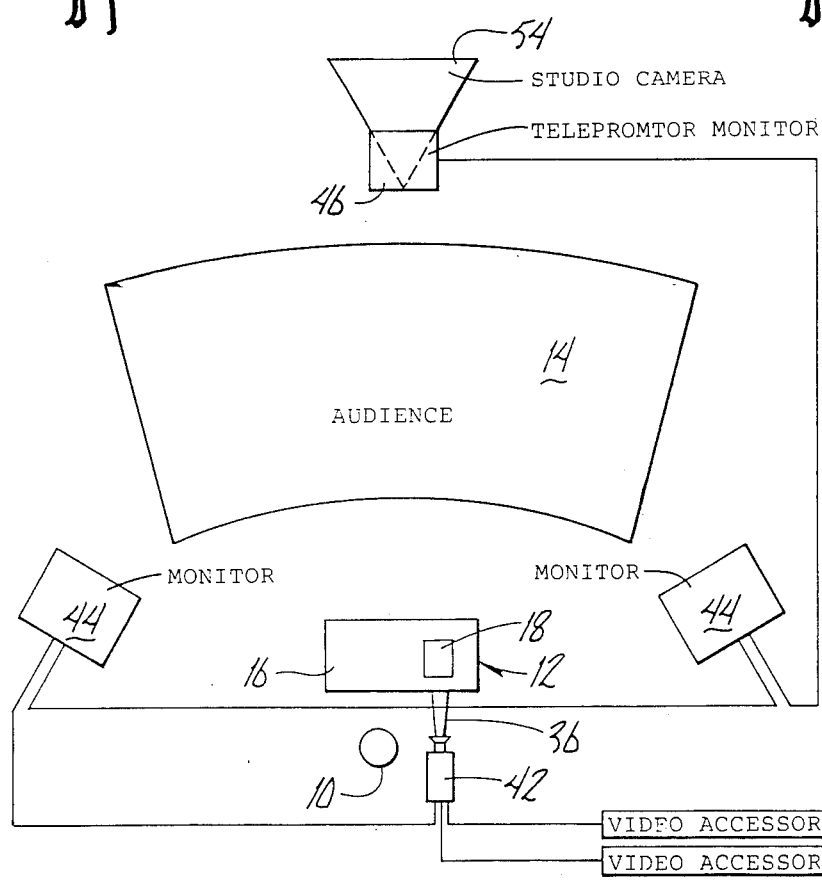
Fig. 3

1

UNDER-HAND PROJECTOR

BACKGROUND OF THE INVENTION

It is common in a classroom or lecture hall for the teacher or lecturer to use visual aids, such as photographic slides and overhead projector transparencies or overlays. Normally, the slide projector or overhead projector projects the image onto a screen positioned behind the speaker near the front wall of the room. This position of the screen allows the audience to view the image without changing their position. However, if the teacher or lecturer wishes to also view the image projected on the screen, he/she must turn his/her back to the audience, thereby losing the normal face-to-face orientation with the class. This loss of visual contact with the audience diminishes the speaker's effectiveness. Also, it is usually necessary to dim the lights in the room when a slide projector or overhead projector is being used.

All of these defects are magnified greatly when the same lecture format is used in the production of educational television or satellite telecourses. Washed-out projections, lighting contrast rations beyond the capability of the television system to produce, difficulty in maintaining the proper 4×5 size ratio of the picture format used in the television system, and turning of the lecturer's back to the studio cameras are among the reasons lectures are hard for a production staff to deal with.

These problems can be avoided, but only at the expense of many hours of pre-production time spent turning all written materials into television graphics. Valuable instructor time is also needed in getting the lecture materials in a more usable form. In addition, to effectively use television graphics and deal with appearing on camera, the instructor must be comfortable with television performance. As with any performing art, it takes most people a long time to become sufficiently accomplished to project themselves to their audience.

Therefore, the primary objective of the present invention is to allow the use of a routine classroom lecture in a television studio situation.

Another objective of the present invention is the provision of an improved projection system for projecting an image from a lecturer to an audience for viewing by the lecturer and by the audience in classes outside the television studio.

Another objective of the present invention is the provision of a means and method of projecting an image for viewing by a speaker and an audience while maintaining the face-to-face orientation between the speaker, the audience, and the television studio cameras.

Still a further objective of the present invention is the provision of a method and means of projecting an image for viewing by a audience in the normal lighting of the room.

A further objective of the present invention is the provision of an improved projection system which is easy to operate and which maximizes the effect of visual aids used by a lecturer or teacher.

SUMMARY OF THE INVENTION

The projection system of the present invention is designed to afford instructors with little or no television performance experience a familiar situation from which they can deliver their lecture. In addition, the system of the present invention allows the speaker to utilize visual aids such as slides and transparent overlays for viewing by both the audience and the speaker while the speaker maintains face-to-face orientation with the audience. This ability to maintain eye contact with a class is important. Since good eye contact is maintained, it is easy to see if someone is having trouble or wants to add to the classroom discussion.

Because the teacher has given many previous lectures, the lecture presented by use of the present invention becomes just another of many. Little experience in television performance is required because, not only is the situation familiar, the materials and their use is second nature. The present invention allows what the instructor might normally write on a blackboard or overhead projector to be written on a transparency which is viewed by a television camera which is connected to the studio switcher and to monitors in the studio for student viewing. This allows the visuals to be incorporated into the program as they are being created. The lecturer views a monitor showing the output on the under-hand projector camera so that he/she can keep within the view of that camera. As can be readily appreciated, this greatly reduces pre-production time and gives the lecturer somewhat more control of the lecture as it proceeds, compared with a more elaborate production.

More particularly, a desk or lectern is provided which has a top surface with an opening therein. A translucent plate is positioned in or over the opening. A mirror is positioned below the translucent plate at approximately a 45° angle with respect to the surface of the lectern. When transparent overlays are being used, the overlays are positioned on top of the translucent plate. An overhead light source illuminates the translucent plate on the lectern. A video camera which is positioned below and behind the top surface of the lectern is focused on the overlay via the reflecting mirror. The video camera is operatively connected to one or more video monitors, one of which is viewed by the lecturer. The image on the overlay which is received by the video camera is thus conveyed to the video monitors for viewing by the audience. At the same time, the lecturer sitting or standing behind the lectern can easily view both the televised and the actual overlay positioned on the lectern while maintaining the face-to-face orientation with the audience.

In an alternative scheme, the video camera takes an overhead view of the translucent plate via one or more mirrors or direct overhead mounting. In this instance, a light source from below the top surface of the desk must be utilized to illuminate the translucent plate. An overhead light allows opaque material to be viewed.

Photographic slides can be utilized in the projection system of the alternative scheme by positioning the slide projector below and behind the top surface of the lecturn and projecting the slide image onto the translucent plate via the angled mirror mounted below the translucent plate. The video camera is focused on the translucent plate so as to convey the image to at least one video monitor for viewing by the audience. The lecturer can view the slide image directly on the translucent plate while maintaining the face-to-face orientation with the audience. The light from the slide projector provides for illumination of the translucent plate.

BRIEF DESCRIPTION OF THE DRAWINGS

FIG. 1 is a perspective view of one embodiment of the projection system of the present invention.

FIG. 2 is a side sectional view taken along lines 2—2 of FIG. 1.

FIG. 3 is a plan view showing a schematic of a lecture room utilizing the projection system of the present invention.

DETAILED DESCRIPTION OF THE PREFERRED EMBODIMENT

Figure 4:
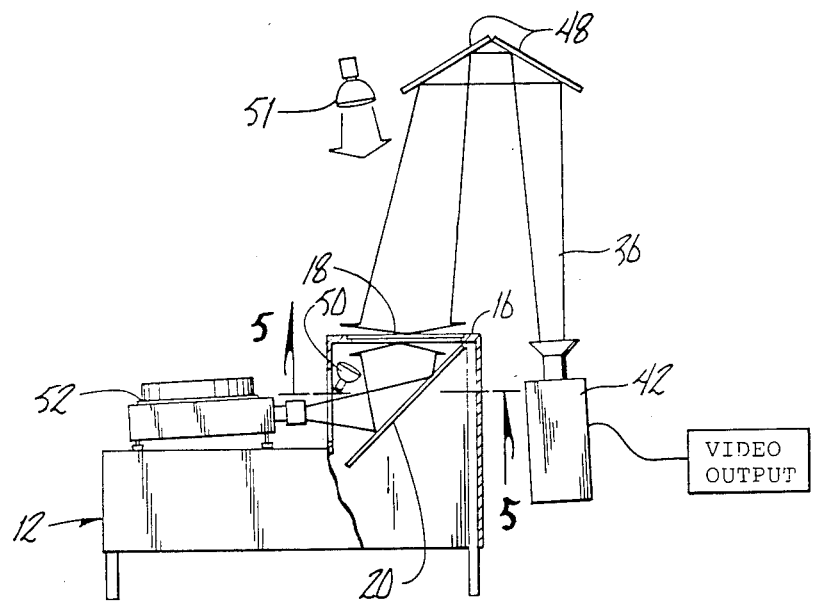
FIG. 4 is a partial sectional side view showing a second embodiment of the projection system of the present invention.
Figure 5:
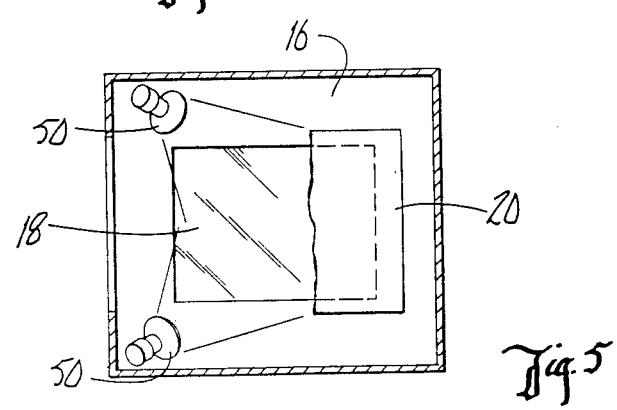
FIG. 5 is a view taken along lines 5—5 of FIG. 4.

The projection system of the present invention is designed for use in a television studio, lecture hall or classroom wherein the lecturer or speaker 10 stands or sits behind a lectern or desk 12 and normally faces the audience 14, as seen in FIG. 3. The lectern 12 has a top surface 16 with a hole extending therethrough. A translucent plate 18 is positioned in the hole such that the top surface of the plate is flush with the top surface of the lectern, as seen in FIG. 2.

A reflecting mirror 20 is positioned below the hole and is angled approximately 45° with respect to the top surface of the lectern. Mirror 20 can be mounted in any convenient manner. In FIG. 2, mirror 20 is shown as being mounted within a protective box 22. Box 22 is connected at its upper forward corner to the lectern by hinge 24. The rear upper corner of box 22 has a lip 26 with a hole therein through which extends a threaded shaft 28 which is connected to the lectern. A wing nut 30 is received on shaft 28 to adjustably connect the upper rear corner of box 22 to the lectern. The rear wall 32 and upper wall 34 of box 22 are substantially open to permit reflection of an optical path by mirror 20 from a position behind and below the top surface of lectern 12 to the translucent plate 18, as represented by arrow 36 in FIG. 2.

When the lecturer desires to use a visual aid such as a transparent overlay 38 or other substantially transparent film having writing or graphics thereon, the overlay is placed directly on transparent plate 18. An overhead light source 40, such as the existing room lights, illuminates translucent plate 18. A video camera 42 is positioned behind and below translucent plate 18, as seen in FIGS. 1 and 3. The camera is focused on the overlay 38, via reflecting mirror 20, such that the image on the overlay is received by the camera and operatively conveyed to at least one video monitor 44 operatively connected to the camera. Preferably the video monitors 44 are positioned such that the audience does not have to turn or otherwise adjust their position to view the overlay image shown on the monitor. At the same time, the lecturer 10 can view the overlay 38 from his/her position behind lectern 12 while maintaining a face-to-face orientation with the audience. Alternatively, camera 42 can be operatively connected to another video monitor 46, such as a teleprompter, facing him/her from behind the audience for viewing the overlay image while facing the audience.

It is understood that the distance the camera 42 is positioned behind lectern 12 is dependent upon the camera lens. Also, the relative height of the camera with respect to the top surface 16 of the lectern is dependent upon the angle of mirror 20. Also, the adjustability of box 22 allows the angle of the mirror to be adjusted so as to accommodate cameras positioned at varying elevations.

An alternative arrangement of the system is shown in FIG. 4. The camera 42 is positioned elsewhere remotely from the lectern and focused on translucent plate 18 via one or more mirrors 48. In this configuration, a source of light 50 will be required to illuminate translucent plate 18 when a transparent overlay is positioned on the top of the translucent plate. Another light source 51 may be required to illuminate opaque objects placed atop the translucent plate if available room light is insufficient for a proper signal.

As further shown in FIG. 4, it is possible to project photographic slides onto translucent plate 18 by the use of a slide projector 52. Slide projector 52 is positioned below and behind translucent plate 18 and the slide image is reflected from mirror 20 onto translucent plate 18. Camera 42, which is focused on the slide image projected on translucent plate 18, conveys the image to the video monitors 44 for viewing by the audience. The lecturer can view the slide image directly from translucent plate 18, or from monitor 46 while maintaining a face-to-face orientation with the audience. By marking on a transparent overlay, the lecturer can note areas of a slide by pointing, circling, underlining, etc.

It is also understood that the present invention, as shown in FIG. 4, can be used for the projection of printing or graphics on opaque material. For example, the page of a book can be placed face up upon translucent plate 18 with the translucent plate being illuminated by light source 51 positioned above the translucent plate. With the camera 42 positioned with a view from above the translucent plate, the image on the opaque material is received by camera 42 via mirror 48, then conveyed to video monitors 44 and 46 for viewing by the audience and lecturer, respectively, while the lecturer maintains a face-to-face orientation with the audience.

With the projection system of the present invention, the lecturer may write on an overlay so that both he/her and the audience can read the writing. Furthermore, the lectern is maintained in a clean and orderly fashion, free from obstruction by an overhead projector, slide projector or other equipment.

The projection system of the present invention is also adaptable for others environments. For example, this system can be used in a normal classroom situation. The system is portable and can be taken on tour, using locally available television receivers. Also, it is understood that video camera 42 can be connected to other video accessories, as shown in FIG. 3, such as a studio switcher, or a radio frequency modulator operating on the VHF or UHF broadcast bands. A radio frequency modulator would also allow audio to be transmitted, possibly obviating some public address system requirements and allowing the lecture to be viewed in a nearby location.

From the foregoing, it is seen that the present invention encompasses at least all of the stated objectives.

What is claimed is:

1. A projection system for projecting an image from a lecturer to an audience for viewing by the lecturer and by the audience who normally face one another, comprising:

a lectern having a top surface, at least a part of which is translucent;

said image being operatively positioned on the translucent part of the top surface of said lectern from above or below the top surface; and a video camera operatively connected to a video monitor facing the audience, a mirror beneath said translucent surface so as to maintain an open and clear area above said top surface of said lectern, said mirror providing for operatively focusing of said camera on the image such that said image is recieved by said video camera and conveyed to said video monitor whereby the audience views the image on the video monitor and the lecturer views the image on the translucent part of the lectern while remaining in a face-to-face orientation with the audience.

2. The projection system of claim 1 wherein a source of light directs light towards the image from the side of the top surface of said lectern opposite the optical path of said camera.

3. The projection system of claim 1 wherein said video camera is operatively connected to a second video monitor facing the lecturer whereby the lecturer views the image on said second monitor while remaining in a face-to-face orientation with the audience.

4. The system of claim 1 wherein the image is on a transparent overlay.

5. The system of claim 1 wherein the image is on a photographic slide.

6. A method of projecting an image from a lecturer to an audience for viewing by the lecturer and the audience who normally face one another, comprising:

operatively positioning said image on a translucent top surface of a lectern from above or below said top surface;

positioning a mirror beneath said surface so as to reflect said image and so as to maintain an open and clear area above said top surface of said lectern;

operatively focusing a video camera on said reflected image; and conveying the image received by said camera to a video monitor operatively connected to said camera and facing the audience whereby the audience views the image on said monitor and the lecturer views the image on said translucent top surface of said lectern while remaining in a face-to-face orientation with the audience.

7. The method of claim 6 further comprising directing light towards the image from the side of said top surface opposite the optical path of said camera.

8. The method of claim 6 further comprising conveying the image received by the camera to a second video monitor operatively connected to said camera and facing the lecturer whereby the lecturer views the image on said second monitor while remaining in a face-to-face orientation with the audience.

* * * * *